June 30, 1936.    J. H. DE BOER ET AL    2,045,637
PHOTOTUBE
Filed July 26, 1935
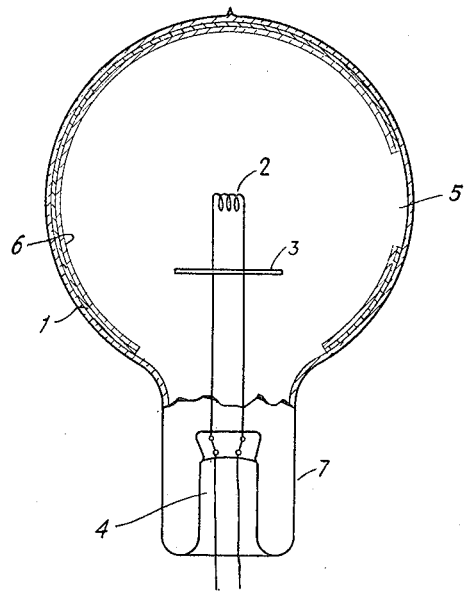
INVENTORS
JAN HENDRIK de BOER
MARTEN CORNELIS TEVES
BY
Charles McClain
ATTORNEY Patented June 30, 1936

2,045,637

UNITED STATES PATENT OFFICE 2,045,637

PHOTOTUBE

Jan Hendrik de Boer and Marten Cornelis Teves, Eindhoven, Netherlands, assignors to N. V. Philips' Gloeilampenfabrieken Application July 26, 1935, Serial No. 33,309
In Germany July 26, 1934

5 Claims. (Cl. 250—27.5)

This invention relates to photo-electric tubes, more particularly to photo-cathodes and the method of making the same.

In the manufacture of a photo-cathode, the photo-electric metal may be applied, as is well-known, to an oxide layer which may be obtained by oxidation of a metallic layer. A conventional way of doing this is to provide a silver layer at the point where the photo-electric electrode is to be formed, superficially oxidize this silver layer, or coating, and deposit a photo-electric metal, e. g. caesium, on the silver oxide layer thus produced, and subsequently thermally treat the electrode. The reaction may be effected in such manner that a layer consisting of a mixture of caesium oxide and silver particles is formed with a thin layer of caesium deposited on this mixed layer. This mixed layer is believed to contain one molecule of caesium oxide to two atoms of silver. If the discharge tube containing the photo-electric electrode is heated in the presence of an excess of caesium, the caesium penetrates into the mixed layer which then contains a mixture of particles of the oxide of the photo-electric metal, as well as particles of the metal itself.

It has previously been proposed to increase the sensitivity of photo-electric electrodes produced as above described by causing silver, gold or another metal to deposit by volatilization on the electrode with the result that the latter becomes coated with a thin layer of this metal. A repeated heating causes this metal to penetrate into the photo-electric electrode so that an additional quantity of foreign metal particles is introduced into the mixed layer.

This method of increasing the sensitivity entails objections. After the photo-electric metal has reacted with the metallic oxide and after an excess of caesium may have penetrated into the mixed layer, that is to say after the photo-electric electrode is finished, the photo-electric electrode has to be heated once more in order to cause the foreign metal provided by volatilization to penetrate into the electrode. This complicates the manufacture and in addition, there is a possibility that the desirable properties of the electrode might be partly lost due to the extra heating, particularly since the heating effected as a rule is at a temperature higher than that at which the photo-electric electrode is formed.

The principal object of our invention is to provide an improved type of photo-cathode and method of making the same.

According to the invention, in the reduction by the photo-electric metal a metallic oxide layer mixed or coated with metal particles is started with. These metal particles instead of being brought into the photo-electric electrode when the latter is completely finished, are brought together with the metallic oxide which is still to be reduced. A repeated heating of an electrode which has already been formed therefore is dispensed with. A further advantage is obtained in that the reduction of the metallic oxide by the photo-electric metal is effected more easily than in the presence of the metallic oxide alone. Thus, the invention increases in a simple and effective manner the contents of non-photo-electric metal particles, which results in a greater sensitivity of the electrode. It has been found that with this larger content of non-photo-electric metal particles the quantity of the photo-electric metal which will penetrate into the mixed layer is also increased.

The metal particles brought together with the metallic oxide to be reduced, may consist of metal the oxide of which is utilized. However, other metals may also be employed.

The aggregate of metallic oxide and metal particles which is subjected to the action of the photo-electric metal can be obtained in different ways. For example, a certain amount of metallic oxide may be formed and prior to the reduction by the photo-electric metal it may be partially reduced in another manner. In this latter case the quantity of metallic oxide which is started with is larger than the quantity to be reduced by the photo-electric metal. The excess is reduced beforehand in another manner.

The partial reduction may advantageously be brought about by the action of hydrogen and it may be facilitated in this case by a gentle heating, for example at about 150° C. The water formed during the reduction is removed from the discharge tube. The quantity of the reduced metallic oxide may be determined at once by determining the amount of the hydrogen which has been taken up. Alternatively, the amount of hydrogen may be dosed in such manner that the photo-electric electrode acquires its highest sensitivity without any risk of the mixed layer of the electrode sintering together. It has been found that with the use of silver oxide the highest sensitivity is obtained when from 10% to 20% of the silver oxide is reduced beforehand. It is advantageous that the reduction by the hydrogen should not be continued so far that more than 50% of the silver oxide is reduced otherwise there is a risk of the structure of the oxide being altered.

A partial reduction of the metallic oxide may also be brought about by an intense illumination. The oxygen which is produced and which escapes is removed in this case by pumping it away or, for example, with the aid of calcium or barium provided outside the photo-electric electrode at a point suitable for this purpose. In this case, too, the amount of the reduced metallic oxide and consequently the quantity of the metal formed can be controlled by regulating the intensity and the duration of the exposure to radiation. The exposure to radiation may be brought about, for example, with the aid of a high pressure mercury lamp. The reaction proceeds more rapidly if both the wall of the lamp and the wall of the discharge tube in which the photo-electric electrode is formed consist of quartz, which permits a strong influence by ultra-violet rays.

The layer to be reduced by the photo-electric metal can also be obtained with the aid of an alloy of a readily oxidizable metal with a less readily oxidizable metal, for example an alloy of silver and gold. This alloy may be cathodically disintegrated in an atmosphere containing oxygen, in which event, if desired, a metal layer utilized as a support for the photo-electric electrode may act as an anode, the arrangement being such that a mixture of oxide of the easily oxidizable metal (for example, silver oxide particles) and particles of the less easily oxidizable metal (for example, gold particles) deposits at the point where the photo-electric electrode is to be formed. The regulation of the proportions of the components of the alloy also allows of regulating the proportion of these oxide particles relatively to the metal particles mixed with them.

The metal particles which are to be brought together with the oxide to be reduced need not always be mixed with the oxide. These metal particles may also be applied to the oxide in form of a thin layer, which may be effected by vaporization and condensation of the metal. When the oxide layer coated with metal particles is submitted to the action of the photo-electric metal, the latter penetrates thru the metal layer so that reduction of the metallic oxide by the photo-electric metal may take place. There also results a mixture of the oxide of the photo-electric metal produced due to the reduction with the particles of the metal layer. The photo-electric metal penetrates the easier thru the metal layer, the stronger the adsorbing action of the subjacent metallic oxide is with respect to the photo-electric metal.

The novel features which we believe to be characteristic of our invention are set forth with particularity in the appended claims, but the invention itself will best be understood by reference to the following description taken in connection with the accompanying drawing in which the figure is a diagrammatic representation of a photo-tube having a photo-cathode made according to our invention.

After the envelope 7 has been exhausted, the inside of its wall is coated almost completely with a silver layer 1 which is effected by volatilizing in vacuo silver applied to a heating wire 2 supported from the press 4. A screen 3 prevents the volatilized silver from depositing in that portion of the tube which contains the press 4. The window 5 is screened in a well-known manner during the formation of the silver layer. After the silver layer 1 has been formed, oxygen, for example at a pressure of from 0.1 to 0.2 millimeter of mercury is admitted and an electric discharge is established between the wire 2 as anode and the layer 1 as cathode, owing to which the silver layer is superficially oxidized. This oxidation is continued until 12 microgram-molecules of oxygen per 100 square centimeters of silver surface are combined with silver to form $Ag_2O$. The amount of oxygen taken up may be found by measuring the decrease of the pressure of the oxygen. After this oxidation, the excess of oxygen is pumped away and hydrogen is introduced into the tube. This hydrogen reduces part of the silver oxide to form silver. This reduction may be quickened by gently heating to about 150° C. The amount of hydrogen introduced is so chosen that 4 microgram-molecules of any 24 microgram-molecules of $Ag_2O$ are reduced. The water produced in the reduction is completely removed with the aid of a pump while the tube is heated to about 150° C. Owing to this reduction there is consequently formed a mixture of silver particles and silver oxide particles.

Subsequently, caesium is introduced into the tube. This caesium can be liberated in a well-known manner from a caesium compound present in the tube, or in a lateral receptacle. Then the tube is fused off, if desired, after being filled with a rare gas, e. g. argon, xenon or crypton, at a pressure of a few hundredths of one millimeter. In closed condition, the whole tube is then heated to a temperature of about 175° C., which results in the silver oxide being reduced by the caesium so that there is formed a layer 6 of a mixture of silver particles and caesium oxide particles into which also free caesium particles penetrate. Besides, this mixed layer adsorbs caesium. The heating of the tube is continued until a satisfactory photo-electric sensitivity is obtained. Then, the excess of caesium is removed in any well-known manner.

With photo-tubes thus produced an average sensitivity of 45 microamps/lumen (color temperature 2600° K.) has been measured whereas in the case of tubes produced in similar manner but without preceding reduction by hydrogen, an average sensitivity of only 30 microamps/lumen was obtained.

Furthermore it has been found that due to the additional amount of silver particles in the mixed layer owing to which also a larger amount of caesium can penetrate into the layer, the maximum of the spectral sensitivity is shifted towards longer wave-lengths. In many cases, this maximum is located above 8000 Å. (Angstrom units). A maximum occurs even at 8500 Å.

Besides it has been found that the long wave limit (red limit) of a photo-cathode made in accordance with our invention is shifted towards longer wave-lengths. Even limits of 1.7 microns have been reached.

If it is not desired to utilize reduction by hydrogen the following procedure may be followed:

In the formation of the silver layer 1 only part of the silver is volatilized from the wire 2. After the introduction of oxygen the silver layer while acting as cathode in an electric discharge is oxidized in such manner that for every 100 square centimeters of surface of the silver layer 10 microgram-molecules of oxygen are taken up to form $Ag_2O$. After the excess of oxygen has been eliminated for example with the aid of a pump, a small amount of silver is volatilized from the wire 2, which silver deposits on the silver oxide.

For example, a quantity of silver corresponding to 8 to 10 microgram-atoms of silver per 100 square centimeters of surface of the silver layer is volatilized. This method also allows of bringing, instead of silver, other metals, for example gold, nickel or tungsten, together with the silver oxide.

A photo-electric metal may be introduced in this case into the tube in the manufacture of the electrode according to the procedure outlined above.

While we have indicated the preferred embodiments of our invention of which we are now aware and have also indicated only one specific application for which our invention may be employed, it will be apparent that our invention is by no means limited to the exact forms illustrated or the use indicated, but that many variations may be made in the particular structure used and the purpose for which it is employed without departing from the scope of our invention as set forth in the appended claims.

What we claim as new is:

1. The method of manufacturing a photo-sensitive electrode comprising depositing a silver layer upon a base, partially oxidizing said silver layer; forming silver particles on said partially oxidized layer and subjecting the resulting layer to the action of caesium in the presence of a rare gas at a pressure of a few hundredths of a millimeter to form a layer including silver particles, caesium oxide particles and pure caesium particles.

2. The method of forming a photo-sensitive electrode comprising forming a metal oxide coating on a metal base, forming particles of the pure metal of the metal oxide on said metal oxide coating and subjecting the resulting coating to the action of a photo-electric material in the presence of a rare gas to form a layer including pure metal particles, particles of the oxide of the photo-electric material and free particles of the photo-electric material.

3. The method of manufacturing a photo-sensitive electrode comprising depositing a silver layer on a base, partially oxidizing said silver layer, forming silver particles on the oxidized layer and subjecting the resulting combined silver and silver oxide surface to the action of a photo-electric metal in the presence of a rare gas in the presence of heat to reduce the coating of silver particles and silver oxide particles to form a coating including silver particles, photo-electric metal oxide particles and free photo-electric metal particles.

4. The method of forming a photo-sensitive electrode comprising forming a silver oxide layer on a metal base, partially reducing the oxide layer, subjecting the resulting layer to the action of caesium in the presence of rare gas to form a layer including silver, caesium oxide and pure caesium particles.

5. A method of forming a photo-sensitive electrode comprising depositing a silver layer on a base, partially oxidizing said silver layer to form a silver oxide, forming particles of silver on said oxidized layer, subjecting the resulting layer to the action of caesium in the presence of a rare gas while heating the electrode to a temperature of approximately 175° C. to form a layer including a mixture of silver particles, caesium oxide particles and free caesium particles, and removing the excess caesium.

JAN HENDRIK DE BOER.
MARTEN CORNELIS TEVES.